D. S. BAZEMORE.
COTTON CHOPPER.
APPLICATION FILED SEPT. 17, 1920.

1,369,604.

Patented Feb. 22, 1921.

Inventor
D. S. Bazemore
by Wilkinson & Giusta.
Attorneys.

UNITED STATES PATENT OFFICE.

DANIEL S. BAZEMORE, OF ATLANTA, GEORGIA.

COTTON-CHOPPER.

1,369,604.  Specification of Letters Patent.  Patented Feb. 22, 1921.

Application filed September 17, 1920. Serial No. 410,832.

*To all whom it may concern:*

Be it known that I, DANIEL S. BAZEMORE, a citizen of the United States, residing at Atlanta, in the county of Fulton and State of Georgia, have invented certain new and useful Improvements in Cotton-Choppers; and I do hereby declare the following to be a full, clear, and exact description of the invention, such as will enable others skilled in the art to which it appertains to make and use the same.

The present invention relates to improvements in cotton choppers, and has for an object to provide a simple, inexpensive, and durable apparatus for the cultivation of cotton.

Another object of the invention is to provide an improved cotton chopper composed of a drum having specially formed blades spaced apart and acting to weed out the superfluous cotton in an effective manner.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a top plan view of an improved cotton chopper constructed in accordance with the present invention;

Figure 1:
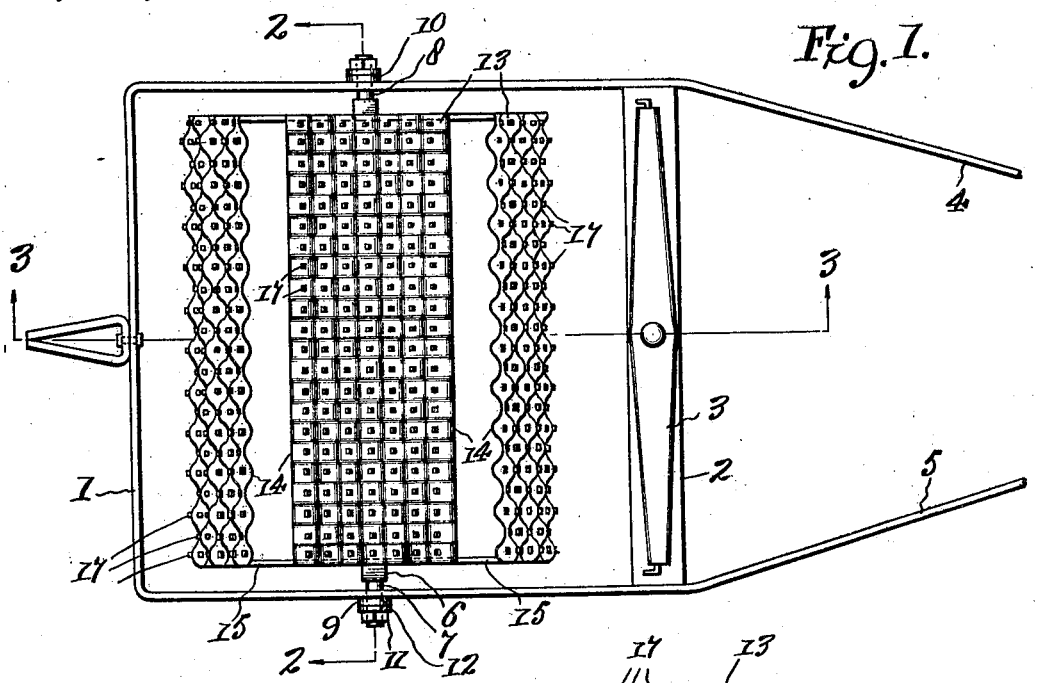
Figure 2:
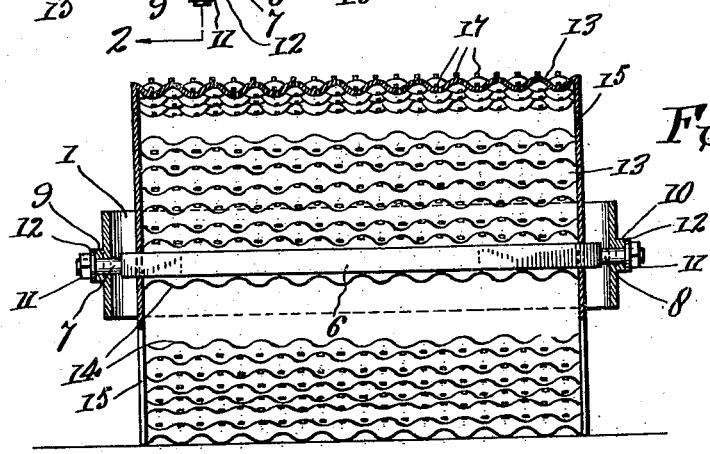
Fig. 2 is a transverse sectional view taken on the line 2—2 in Fig. 1.
Figure 3:
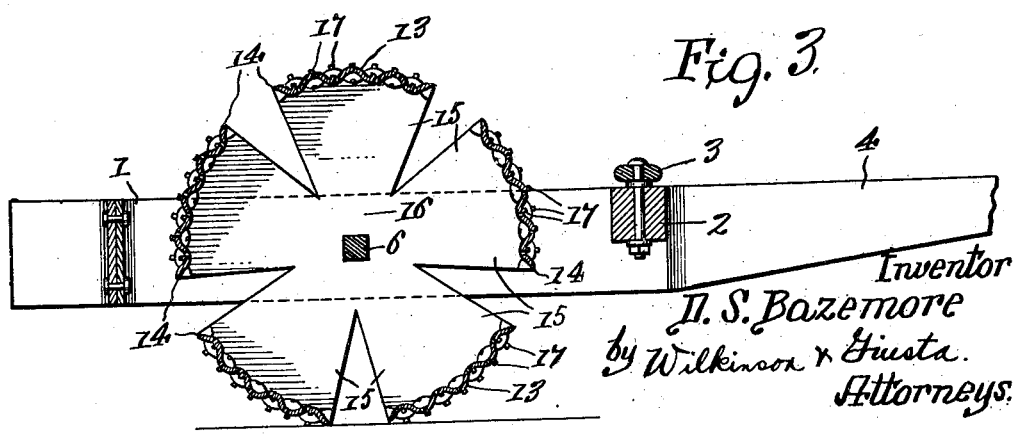
Fig. 3 is a longitudinal sectional view taken on the line 3—3 in Fig. 1.

Referring more particularly to the drawings wherein is shown only one embodiment of the present invention, 1 designates a framework which may be of any suitable construction, preferably of the rectangular form shown most clearly in Fig. 1, and 2 designates a cross beam at the forward end of the rectangular framework. The frame 1 receives a swingletree 3 to which a draft animal is hitched. The shafts are indicated at 4 and 5.

According to the invention the frame 1 is constructed and arranged to receive a shaft 6 extending transversely thereacross and approximately midway of the length thereof, the ends of the shaft being reduced and rounded to provide trunnions 7 and 8 rotating in bearing boxes 9 and 10 formed in said frame. The trunnions are adapted to rotate freely in the bearing boxes as will be understood. Nuts 11 are run on the exteriorly threaded ends of the trunnions and preferably washers 12 will be interposed between the nuts and the adjacent faces of the bearing boxes. The shaft 6 inwardly of the trunnions is preferably square in cross section and is adapted to receive a malleable steel drum which both supports the frame work 1 and carries blades 13 adapted to come in contact with the ground and uproot the cotton at suitable intervals, leaving only that necessary to good cultivation.

The blades 13 are provided with edges 14 which are spaced apart preferably through substantially three-inch gaps as this spacing is found to be substantially correct for the weeding of the cotton. The blades and the other portions of the drum are molded together, the blades being supported by spokes or arms 15 extending through a central hub 16 which is carried by the axle 6. The blades 13, which are preferably five in number, are also with advantage made fourteen inches long and provided with corrugations which extend both in a transverse and a longitudinal direction, the corrugations being with advantage made of a depth of three-fourths of an inch. The metal is also punched through from the interior outwardly to provide prongs 17 which bite into the ground and form an effective means of turning the drum and also forcing the knife edges through the cotton plants. The drum is entirely hollow inside so that plants, soil, and other foreign matter getting into the same may freely find its escape through the gaps between the knives.

In operation, the machine is drawn through the cotton field, the drum rotating over the ground so that the blade edges are successively brought into contact with the cotton plants at intervals so as to uproot and weed out those plants that are unnecessary and unfavorable to the growth of the rest of the cotton. This movement of the wheel will be facilitated by the corrugated character of the blades which will come firmly into contact with the cotton rows aided by the prongs 17 which will force the knives effectively through the ground and roots of the plants.

The construction of the wheel from malleable steel molded in one piece and formed with the strengthening corrugations provides a durable machine which will possess an indefinite life and the simplicity of the device will make it improbable for it to get out of running order.

I do not wish to be restricted to the size, form, and proportions of the various parts, and obviously changes could be made in the construction herein described without departing from the spirit of the invention, it being only necessary that such changes fall within the scope of the appended claims.

What is claimed is:—

1. An improved cotton chopper comprising a framework and a drum rotatably mounted in the framework and provided with spaced apart blades corrugated both transversely and longitudinally, substantially as described.

2. An improved cotton chopper comprising a framework, a drum mounted therein and fitted to rotate in contact with the ground, said drum including a plurality of spaced apart curved blades being corrugated longitudinally and transversely, substantially as described.

3. An improved cotton chopper comprising a framework, an axle journaled therein, and a drum rotating with the axle and composed of a plurality of spaced apart curved blades being corrugated longitudinally and transversely and provided with projecting prongs, substantially as described.

4. An improved cotton chopper comprising a rectangular open framework, shafts connected thereto, an axle rotating in said framework and extending transversely thereacross at substantially midway the length thereof, a malleable steel drum molded on said axle composed of a hub, spokes radiating from the hub, and curved blades carried by the outer ends of said spokes and having sharp cutting edges spaced apart, said blades being corrugated both longitudinally and transversely and provided with prongs punched outwardly from the crests of the corrugations, substantially as described.

DANIEL S. BAZEMORE.